Nov. 9, 1965                H. D. FOUST                3,216,732
                            BIMETAL SEAL
                         Filed Dec. 14, 1962

HARRY D. FOUST
INVENTOR

BY John R. Faulkner
   Stuart Lubitz
ATTORNEYS

3,216,732
BIMETAL SEAL
Harry D. Foust, Dakota, Minn., assignor to Ford Motor Company, Dearborn, Mich., a corporation of Delaware
Filed Dec. 14, 1962, Ser. No. 244,651
6 Claims. (Cl. 277—26)

This invention relates to a supporting and sealing structure. More particularly, this invention relates to a bimetal seal which also may function as a structural support.

In the design and assembly of heat exchangers there has existed the problem of sealing the circumference of the heat exchanger core or matrix after it has been placed in position in the heat exchanger. There have been prior art attempts to accomplish this sealing by spring urged seals or well-known gasket arrangements. These attempts have been too complicated to be practical or have not been effective seals. Further these arrangements have been particularly unsuitable for structures which must withstand high temperatures such as 1500° F.

I have solved the problem of sealing a heat exchanger matrix which operates at high temperatures by utilizing a bimetal structural member which becomes a more effective seal as the temperature rises. When the heat exchanger is assembled at the ambient temperature, the sealing function is unimportant. At this temperature the bimetal serves only as a structural member which permits a relatively large clearance to exist for assembly purposes. When the heat exchanger assembly is placed into operation, the bimetal is heated and it immediately clamps against the heat exchanger matrix to properly seal the assembly. Any increase in temperature serves to increase the clamping force of the already effective seal. The seal is improved at higher operating temperatures and is so designed that the increased sealing force is entirely caused by the seal. This self-contained loading of the seal reduces the weight, space requirements and complexity of the seal.

These and other advantages will become apparent as the detailed description of the structure is read in conjunction with the figures wherein.

Figure 1:
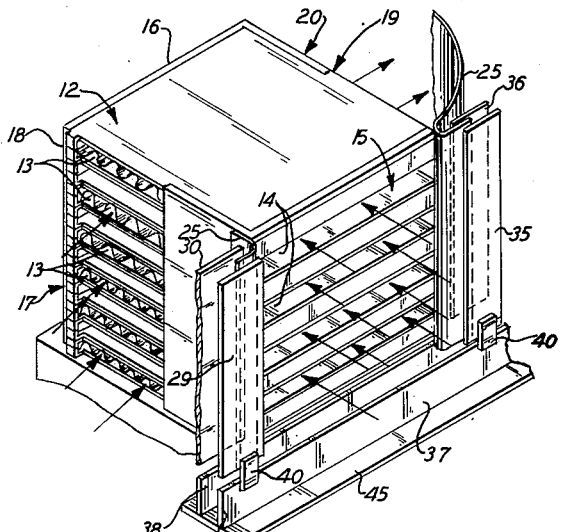
FIGURE 1 is a perspective view of the heat exchanger matrix and bimetal sealing member.
Figure 2:
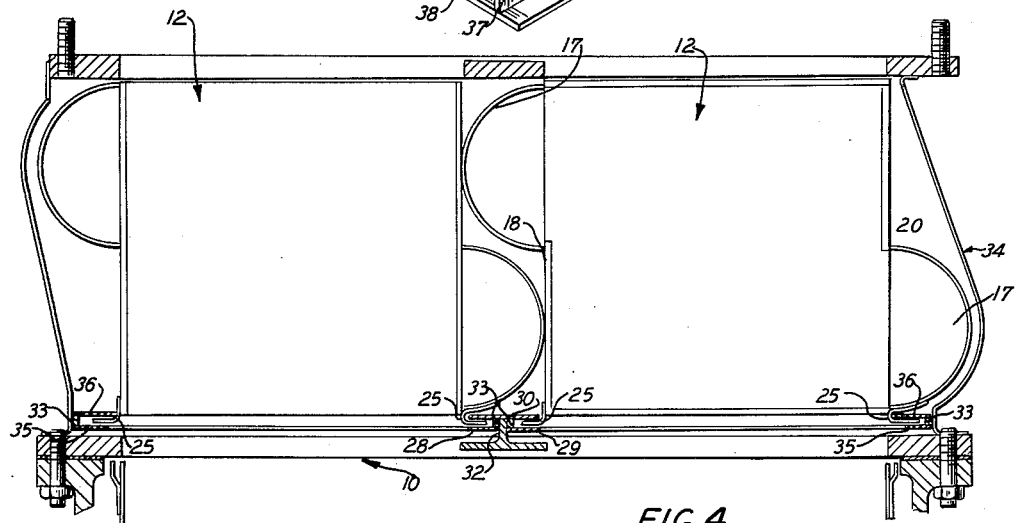
FIGURE 2 is a top view of the heat exchanger assembly embodying the invention.
Figure 4:
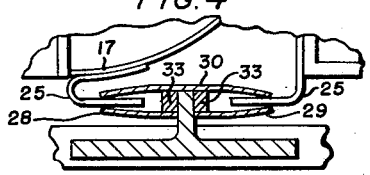
FIGURE 4 is a view corresponding to FIGURE 3 showing the parts in a different operative position.
Figure 3:
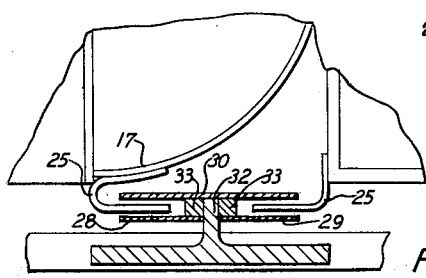
FIGURE 3 is an enlarged view of a portion of FIGURE 2.

Referring to the FIGURES 1–3, a recuperator or heat exchanger 10 is shown having a plurality of heat exchanger cores or matrices 12. The recuperator heat exchanger may be used in a gas turbine engine or in other environment in which it is desirable to transfer heat from one fluid to another fluid. The cores 12 have a plurality of stacked pipelike passageways 12 which are separated by channels 14. A fluid such as air enters the channels 14 along the front surface 15 of the core and exit at the back surface 16 of the core 12. A fluid such as air enters the passageways 13 through the opening 17 along a first or left side surface 18 and exits after traveling along an irregular path at the opening 19 on a second or right side surface 20. Typically, a gas enters the channel 14 at a temperature of 1000 to 1200° F. and exits at 700–900° F., while a gas enters the passageways 13 at 400–600° F. and leaves at a temperature of 800–1000° F.

The core 12 has a member or more particularly a plate member such as the angle member 25 located around or about a portion of the circumference of the frontal surface 15. The plate member 25 may be made from a plurality of members which are fastened to the core 12 by any suitable fastening means such as a spot or continuous weld. In FIGURE 1 plate member 25 is placed on two sides of the frontal surface 15 of the heat exchanger core. It should be understood, however, that the plate member 25 may be placed on as many sides as desired and still be consistent with the broad aspects of the invention.

A plurality of bimetal plate members 28, 29 and 30 are located adjacent the plate member 25 at the center of the heat exchanger and are fastened to the flange 32 by welding a plurality of metal bars 33 to the flange and then welding the plates 28, 29 and 30 to the bars 33 and the flange 32. The flange 32 is formed by a structural T that is part of the heat exchanger housing 34. The bimetal plates 35 and 36 at the right and left ends of the heat exchanger are also fastened to the housing 34 by welding them to the bars 33 which are welded to the housing 34. The plates 29, 30, 35 and 36 are joined at their lower ends to a pair of bimetal plates 37 and 38 by the overlapping joints 40 which comprise a metal strip welded to the plates 29 and 37, 35 and 37, 30 and 28, and 36 and 38. The plates joined by the overlapping joint 40 are separated slightly when joined to allow for temperature growth. The bimetal plates 37 and 38 are also attached to the housing 34 by welding them to the bars 33 and to the structural member 45 which is part of the housing.

In a typical construction the distance between the bimetal plates 29 and 30 or 28 and 30 is approximately 0.100 inch and the plate member 25 is centrally located in this space and has a dimension of 0.040 inch, thereby permitting a total clearance of 0.060 inch or approximately 0.030 inch on each side of the plate member 25. The bimetal plate may be made from a commercially available bimetal such as Chace No. S–885. This material consists of two grades of stainless steel SAE–304 and SAE–430 that have been molecularly bonded together. The SAE–304 stainless steel is an austenitic 18–8 stainless steel having a coefficient of thermal expansion of $11.0 \times 10^{-6}$ inches per inch degree F. The SAE–430 stainless steel is a ferritic, 16 percent chromium, 0.5 percent nickel stainless steel having a coefficient of thermal expansion of $6.6 \times 10^{-6}$ inches per inch degree F. This structure was utilized in a recuperator operating at a minimum temperature of 1094° F. and a maximum temperature of 1300° F.

From the detailed description above it should be apparent that the bimetal plates 28, 29, 30, 35, 36, 38 and 37 form a U-shaped channel member or a bimetal picture frame for receiving and for supporting a heat exchanger 10 or more particularly the plate member 25 which is fastened to the core 12. At room temperature the core 12 may be easily placed into the U-shaped bimetal channel member as adequate clearance is provided to receive the plate member 25. When the heat exchanger 10 and core 12 are placed into operation the flowing of the hot gases will cause the bimetal plates to deflect toward the plate member 25 and eventually abut the plate member 25, as shown by the broken lines in FIGURE 3. The bimetal plates abut the angle member 25 with a force that is proportional to the operating temperature. Thus the bimetal seal increases its effectiveness with rising temperatures. It should also be noted that the use of a bimetal channel-shaped member provides two sealing surfaces on each angle member 25. For example, the plate 29 abuts the frontal portion of the angle member 25 to form a sealing surface and the bimetal plate 30 abuts the back surface of the angle member 25 to form a second sealing surface.

It will be understood that the invention is not to be limited to the exact construction shown and described, but that various changes and modifications may be made without departing from the spirit and scope of the invention, as defined in the appended claims.

I claim:

1. A multi-member joint including first and second adjacent members having a clearance therebetween, a source of fluid varying in temperature flowable past said members, and means between said members to seal the said clearance against flow of fluid therethrough, said means including a first substantially channel-shaped element closed at one edge and open at the opposite edge and secured adjacent its closed edge to said first of said members, the open edge of said element being defined by thermally responsive portions spaced from each other at low temperatures of said fluid, and a second element joined to said second member and extending to a position adjacent the open edge of said first element, the said thermally responsive portions being movable towards said second element in response to increases in the temperature of said fluid to sealingly engage said second element and prevent the flow of fluid through said clearance.

2. A multi-member joint including first and second members in an end-to-end relationship having a clearance therebetween, a source of fluid varying in temperature flowable past said members, and means between said members to seal the said clearance against flow of fluid therethrough, said means including a first substantially channel-shaped element closed at one edge and open at the opposite edge and secured adjacent its closed edge to said first of said members, the open edge of said element being defined by thermally responsive portions spaced from each other at low temperatures of said fluid, and a second element joined to said second member and extending to a location adjacent the open edge of said first element, the said portions being movable towards said second element in response to increases in the temperature of said fluid to sealingly engage said second element and prevent the flow of fluid through said clearance.

3. A multi-member joint including a pair of adjacent members having a clearance therebetween, a source of fluid varying in temperature flowable past said members, and means between said members to seal the said clearance against flow of fluid therethrough, said means including a pair of spaced thermally responisve bimetal elements arranged in side-by-side relationship joined at one edge to each other and to one of said members to seal the space between the elements at the one edge, said elements being spaced from each other at their opposite edges at low temperatures of said fluid to define an opening therebetween, and another element joined to said other member and projecting into the opening between said pair of elements, the spaced edges of said bimetal elements defining said opening being bendable towards one another in response to higher temperatures of said fluid to engage said another element with a clamping force that increases in proportion to the increase in fluid temperature to prevent the flow of fluid through said opening and clearance.

4. A multi-member joint including a pair of members in a side-by-side relationship providing a clearance space therebetween, a source of fluid varying in temperature flowable past said members, and means between said members to seal the space therebetween against flow of fluid therethrough, said means including a pair of connected channel fluid sealing elements arranged in a back-to-back relationship between said pair of members, said elements each being closed at their adjacent edges and having an opening at the opposite edges, each of said pair of members having a sealing element secured thereto and extending into the opening of one of said channel elements, the opening in each of said latter elements being defined by thermally responsive portions spaced from the elements secured to said pair of members at low temperatures of said fluid and movable towards one another in response to higher temperatures of said fluid to engage the member element associated therewith to seal said clearance space.

5. A multi-member joint including a pair of members in a side-by-side relationship providing a clearance space therebetween, a third member adjacent one end of said pair of members, a source of fluid varying in temperature flowable past said members, and means between the adjacent portions of said members to seal the space therebetween against flow of fluid therethrough, said means including a pair of channel fluid sealing elements arranged in a back-to-back relationship between said pair of members and sealingly connected to said third member, said elements each having a closed edge and an opening at the opposite edge, each of said pair of members having a sealing element secured thereto and extending into the opening of one of said channel elements, the opening of each of said latter elements being defined by thermally responsive portions spaced from the elements secured to said pair of members at low temperatures of said fluid and movable towards one another in response to higher temperatures of said fluid to engage said last mentioned elements to seal said space.

6. A multi-member joint including a pair of members in a side-by-side relationship providing a clearance space therebetween, a third member adjacent one end of said pair of members, a source of fluid varying in temperature flowable past said members, and means between the adjacent portions of said members to seal the space therebetween against flow of fluid therethrough, said means including a pair of substantially U-shaped fluid sealing elements arranged in a back-to-back relationship between said pair of members and sealingly connected to said third member, each of said pair of members having a sealing element secured thereto and extending into the opening of one of said U-shaped elements, said U-shaped elements having thermally responsive bimetal leg portions spaced from the elements secured to said pair of members at low temperatures of said fluid and movable towards one another in response to higher temperatures of said fluid to engage said last mentioned member elements with a fluid sealing force that varies in proportion to the change in temperature of said fluid.

References Cited by the Examiner

UNITED STATES PATENTS

| 1,857,961 | 5/32 | Lamb | 277—26 |
| 2,064,928 | 12/36 | Lewis | 165—167 |
| 2,824,758 | 2/58 | Cattrell | 285—187 |

LAVERNE D. GEIGER, *Primary Examiner.*

LEWIS J. LENNY, CHARLES SUKALO, *Examiners.*